(12) United States Patent
Brice et al.

(10) Patent No.: US 12,345,230 B2
(45) Date of Patent: Jul. 1, 2025

(54) SYSTEM AND METHOD FOR ASSEMBLING OR DISASSEMBLING OF A WIND TURBINE

(71) Applicant: Siemens Gamesa Renewable Energy A/S, Brande (DK)

(72) Inventors: Russell James Brice, Daugard (DK); Jesper Moeller, Brande (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 213 days.

(21) Appl. No.: 17/174,007

(22) Filed: Feb. 11, 2021

(65) Prior Publication Data
US 2021/0254601 A1 Aug. 19, 2021

(30) Foreign Application Priority Data
Feb. 19, 2020 (EP) .................................... 20158238

(51) Int. Cl.
*F03D 13/10* (2016.01)
*B66C 1/10* (2006.01)
(Continued)

(52) U.S. Cl.
CPC .............. *F03D 13/10* (2016.05); *B66C 1/108* (2013.01); *B66C 13/063* (2013.01);
(Continued)

(58) Field of Classification Search
CPC ....... B66C 1/108; B66C 13/06; B66C 13/063; B66C 13/105; B66C 13/18; B66C 13/20;
(Continued)

(56) References Cited

U.S. PATENT DOCUMENTS 2,998,148 A * 8/1961 Himel, Jr. ................ B66D 1/48
414/139.7
3,648,858 A * 3/1972 Barron .................... B63B 27/10
254/290
(Continued)

FOREIGN PATENT DOCUMENTS

CN 110506024 A 11/2019
EP 1247778 A2 * 10/2002 ............... B66D 1/08
(Continued)

OTHER PUBLICATIONS

European Search Report issued on Aug. 26, 2020 for application No. 20158238.4.

*Primary Examiner* — Emmanuel M Marcelo
*Assistant Examiner* — Henrix Soto
(74) *Attorney, Agent, or Firm* — Schmeiser, Olsen & Watts, LLP

(57) ABSTRACT

Provided is a system for assembling or disassembling components of a wind turbine including: a motion compensation mechanism, wherein the motion compensation mechanism includes: a first connection interface for connection with a first component of the wind turbine moved by a crane, a second connection interface for connection with a second component of the wind turbine, a tension element connecting the first connection interface and the second connection interface, and a tension device for keeping the tension element under constant tension as the first component and the second component move relative to each other, wherein the motion compensation mechanism allows a movement of the first component relative to the second component as the first component and the second component are moved relative to each other on a given trajectory.

14 Claims, 1 Drawing Sheet

Figure 1:
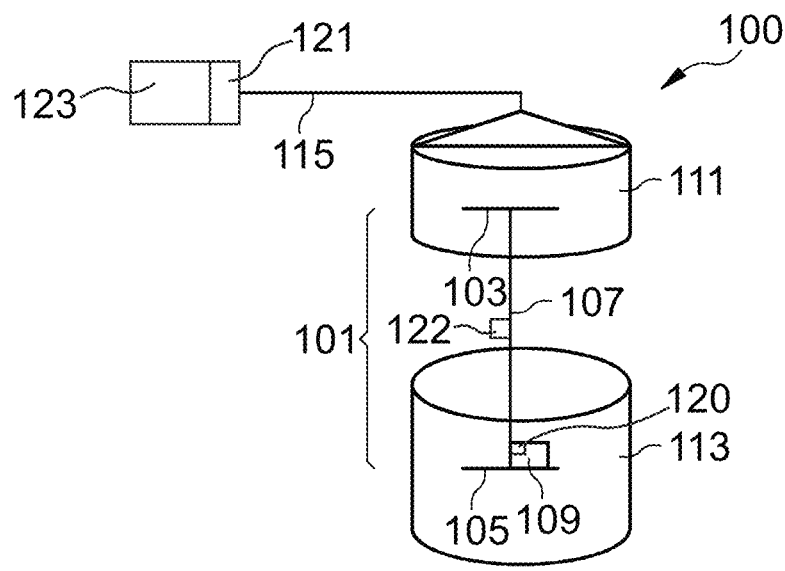

(51) Int. Cl.
*B66C 13/06* (2006.01)
*B66C 13/10* (2006.01)

(52) U.S. Cl.
CPC ...... *B66C 13/105* (2013.01); *F05B 2230/604* (2013.01); *F05B 2230/61* (2013.01)

(58) Field of Classification Search
CPC ......... B66C 13/22; B66C 13/23; B66C 13/24; B66C 13/26; B66C 13/28; B66C 23/00; B66C 23/52; B66C 13/04; B66C 13/10; F03D 13/10; F03D 13/20; F03D 13/40; F03D 80/00; F05B 2230/60; F05B 2230/604; F05B 2230/61; Y02E 10/72; Y02E 10/728; Y02P 70/50; B66D 1/50
USPC ....................................................... 212/284
See application file for complete search history.

(56) References Cited

U.S. PATENT DOCUMENTS

| | | | |
|---|---|---|---|
| 4,324,385 A | 4/1982 | Cojean et al. | |
| 4,412,598 A * | 11/1983 | Kimon | B66D 1/52 182/19 |
| 6,439,407 B1 * | 8/2002 | Jacoff | B66C 13/06 212/274 |
| 8,069,634 B2 * | 12/2011 | Livingston | F03D 13/10 52/848 |
| 9,016,029 B2 * | 4/2015 | Wagner | E04H 12/342 52/745.18 |
| 9,376,291 B2 * | 6/2016 | Laurens | F03D 13/10 |
| 9,651,021 B2 * | 5/2017 | Neumann | B66D 1/60 |
| 2017/0015530 A1 * | 1/2017 | Southerland, Jr. | B66C 1/101 |
| 2020/0122984 A1 | 4/2020 | Elbrandt et al. | |

FOREIGN PATENT DOCUMENTS

| | | | | |
|---|---|---|---|---|
| EP | 1350953 A2 * | 10/2003 | ........... | B66C 23/207 |
| EP | 2896589 A1 | 7/2015 | | |
| EP | 2927176 A1 * | 10/2015 | ............. | B66C 13/04 |
| FR | 2493290 A * | 5/1982 | ............... | B66D 1/52 |
| GB | 2005218 A | 4/1979 | | |
| KR | 20170125546 A * | 11/2017 | | |
| NL | 2018789 B1 * | 11/2018 | | |
| WO | WO-9721621 A1 * | 6/1997 | ........... | B66C 23/207 |
| WO | 0129366 A1 | 4/2001 | | |
| WO | 2012075607 A1 | 6/2012 | | |
| WO | 2013113377 A1 | 8/2013 | | |
| WO | WO-2015114137 A1 * | 8/2015 | ............. | F03D 1/001 |
| WO | WO-2019074364 A1 * | 4/2019 | ............. | F03D 13/10 |

\* cited by examiner

SYSTEM AND METHOD FOR ASSEMBLING OR DISASSEMBLING OF A WIND TURBINE

CROSS-REFERENCE TO RELATED APPLICATIONS

This application claims priority to EP Application Serial No. 20158238.4, having a filing date of Feb. 19, 2020, the entire contents of which are hereby incorporated by reference.

FIELD OF TECHNOLOGY

The following relates to a system and a method for assembling or disassembling of components of a wind turbine.

BACKGROUND

For assembling of wind turbines, several components, such as generator and a nacelle need to be connected. As wind turbines are tall buildings, the components have to be carried by a heaving system, such as a crane, for example.

In particular, during marine based assembly operations, where cranes on floating vessels are used for heaving components, the movement of the components is influenced by environmental conditions such as wind and waves. Thus, environmental conditions may cause high loads on the heaving system and endanger technicians working on the components.

SUMMARY

An aspect relates to provide a motion control of components of a wind turbine moving independent from each other while undergoing assembly or disassembly in a dynamic environment.

According to a first aspect of embodiments of the invention, the above described aspect is solved by a system for assembling or disassembling components of a wind turbine. The system comprises a motion compensation mechanism. The motion compensation mechanism comprises a first connection interface for connection with a first component of the wind turbine moved by a crane, a second connection interface for connection with a second component of the wind turbine, a tension element connecting the first connection interface and the second connection interface, and a tension device for keeping the tension element under constant tension as the first component and the second component move relative to each other, wherein the motion compensation mechanism allows a movement of the first component relative to the second component as the first component and the second component are moved relative to each other on a given trajectory.

In the context of the embodiments of present invention, a tension element under a constant tension is a flexible element that is constantly pulled with a pulling force in order to keep the flexible element taut.

The system described herein is based on the principle that a motion compensation mechanism is connected to two components of a wind turbine that allows for moving of the two components independent from each other but at the same time guides the components on a given trajectory. Thus, the motion compensation mechanism pulls the components together or releases the components with a defined retention force.

The motion compensation mechanism comprises a first connection interface and a second connection interface that are moveable independent from each other. Thus, the particular connection interfaces can move together with particular components to which the particular parts are attached.

In order to compensate or minimize a movement of particular components in a direction other than a given trajectory, the motion compensation mechanism comprises a tension element connecting the two connection interfaces. The tension element is configured to transfer loads between particular components attached to the particular connection interfaces. For this reason, the tension element is constantly kept taut.

The tension element may comprise a rope, a chain and/or an elastic element.

For keeping the tension element constantly taut, the motion compensation mechanism comprises a tension device. The tension device may be a motor, a winch, an elastic element and/or a weight providing a tension force that keeps the tension element taut.

The tension force is controlled such that the motion compensation mechanism allows a movement of the first component relative to the second component as the first component and the second component are moved relative to each other on a given trajectory. Thus, the tension force is dynamically enhanced as a force pulling on the tension element lowers. For this reason, the system may have a force sensor that measures a force pulling on the tension element and a control device for controlling a tension force applied on the tension element in order to keep the tension element taut.

For example, in case a force pulling on the tension element is lower than a given threshold, a first control signal may be provided by the force sensor indicating that a tension force applied on the tension element shall be enhanced. In case a force pulling on the tension element is higher than a given threshold, a second control signal may be provided by the force sensor indication that a tension force applied on the tension element shall be lowered. The first and the second control signals may be indicated by an output device in order to inform a user. Alternatively, or additionally, the first and second control signals may be sent to a tension device for controlling the tension force.

Further, the tension force provides a counterforce to the forces of the movement of the components pointing away from the given trajectory.

According to an example, the motion compensation mechanism is configured to provide a counterforce to a force that causes an increasing distance between the first component and the second component.

In a case where two components are assembled in order to build a wind turbine, the two components are moved relative to each other on a given trajectory, i.e. the two components are pulled together. If at least one of the components moves away from the given trajectory, for example becomes lifted up due to waves heaving a vessel on which a crane is mounted that lifts one of the components, the component moves with a heaving force and the motion compensation mechanism lengthens in order to allow for the movement and to discharge the crane from the loads that would occur when the movement of the component would be blocked.

As the motion compensation mechanism, in particular the tension element, lengthens, a counterforce is provided that softens the movement of the component away from the given trajectory. The counterforce may be provided by the tension device and/or the tension element as such, using elastic elements, for example, and/or an optional drive device such as motor, a winch, a pneumatic cylinder, a hydraulic cylinder or a weight, for example.

The counterforce may be controlled or adjusted dynamically in response to the movement of the components to be assembled or disassembled. For controlling the counterforce, as force sensor may be used that measures a force pulling at the tension element. The measurements of the sensor may be used to calculate a corresponding counterforce that equals the measured force, for example.

The motion compensation mechanism constantly allows for movement along a given trajectory. Thus, in case of an assembly procedure, the motion compensation mechanism allows for a movement of two components towards each other and in case of a disassembly, the motion compensation mechanism allows for a movement away from each other without providing a significant counterforce for movement along the given trajectory.

According to an example, the motion compensation mechanism is configured to pull the first component and the second component together or to release the first component for a movement of the first component and the second component apart from each other.

For pulling two components together and/or for securing two components with respect to each other, the motion compensation mechanism may use a drive device, such as motor, a winch, a hydraulic cylinder, a pneumatic cylinder. The drive device may be used as a brake to provide a counterforce for a movement of the first component and the second component apart from each other, thereby tightening the tension element.

According to an example, the motion compensation mechanism comprises an interface for releasing or compensating a movement of the first connection interface relative to the second connection interface.

In order to lift a first component up, it is favorable to release a movement of the connection interfaces of the motion compensation mechanism. As the first component is close to the second component, the movement of the connection interfaces can be compensated by activating a drive device for providing a counterforce to the movement of the first component away from a given trajectory, for example. The drive device may be activated using an interface such as an electronic remote control of the drive device. Additionally, or alternatively, releasing or compensating a movement of the first connection interface relative to the second connection interface may be controlled by using a mechanical interface such as a bolt or a brake to be engaged or released.

According to an example, the tension device is configured to apply a torque on the tension element that allows a movement of the first component back and forth on the given trajectory but constantly keeps the tension element under tension.

The tension element according to embodiments of the present invention transfers loads of movements between the two connection interfaces and, therefore, between two components to be assembled or disassembled. In order to avoid an overload of the tension element, the motion control mechanism or the components, the tension element may be configured to allow a movement of the first connection interface back and forth on the given trajectory but constantly keeps the tension element under tension.

According to an example, the tension device is configured to apply a force on the tension element that blocks a movement of the first component back and forth on the given trajectory as soon as the first component is in contact with the second component.

In order to block a relative movement of a first component and a second component relative to each other as soon as they are in contact and thereby securing technicians for fastening fixing elements on the first component and the second component, a high predetermined force may be applied on the tension element that secures the first component on the second component. The force may be maintained such that a lifting rigging above the first component is held tight to the first component. Movement between a first component and a crane are then managed by the first connection element of the motion compensation mechanism.

According to an example, the system disclosed herein comprises a number of first guides and a number of second guides that are configured to guide the first component and the second component on the given trajectory.

By using guides, such as elongated bolts and/or pipes, for example, the movement of the first component relative to the second component can be further limited. The guides may be used to buffer forces that cause a movement of the first and/or the second component. The guides may be attached to different areas on the tension element and/or attached to the first connection interface and/or the second connection interface. The guides may be configured to guide the tension element and, therefore, guide the components connected with the tension element on a given trajectory.

According to an example, the system comprises a contact sensor for sensing a contact between the first component and the second component, and a control device that is configured to control the tension device in response to a signal provided by the contact sensor indicating a contact between the first component and the second component such that the tension device applies a force on the tension element that blocks a movement of the first component back and forth on the given trajectory.

By using a contact sensor for sensing a contact between the first component and the second component, a force for securing the first component on the second component can be provided automatically in response to a signal provided by the contact sensor.

In a second aspect of embodiments of the present invention relates to a method for connecting a first component and a second component. The method comprises a connection step for connecting an embodiment of the system described herein with a first component using the first connection interface and with the second component using the second connection interface, a moving step for moving the first component relative to the second component on a given trajectory by a crane using the motion compensation mechanism, wherein the motion compensation mechanism allows a movement of the first component relative to the second component as the first component and the second component move relative to each other on the given trajectory, and a compensation step for keeping the tension element under constant tension as the first component and the second component move relative to each other.

The method described herein is based on the system described herein. Thus, the movement compensation mechanism is used to move a first component and a second component relative to each other on a given trajectory. In particular, the movement compensation mechanism is used to minimize movement of the components away from the given trajectory.

According to an example, the method may further comprise a blocking step for applying a blocking force on the tension element that blocks a movement of the first component back and forth on the given trajectory as the first component and the second component contact each other, a fixation step for fixating the first component on the second component using a number of fixings, a release step for releasing the blocking force from the first component, and a removing step for removing the system from the first component and the second component.

BRIEF DESCRIPTION

Figure 2:
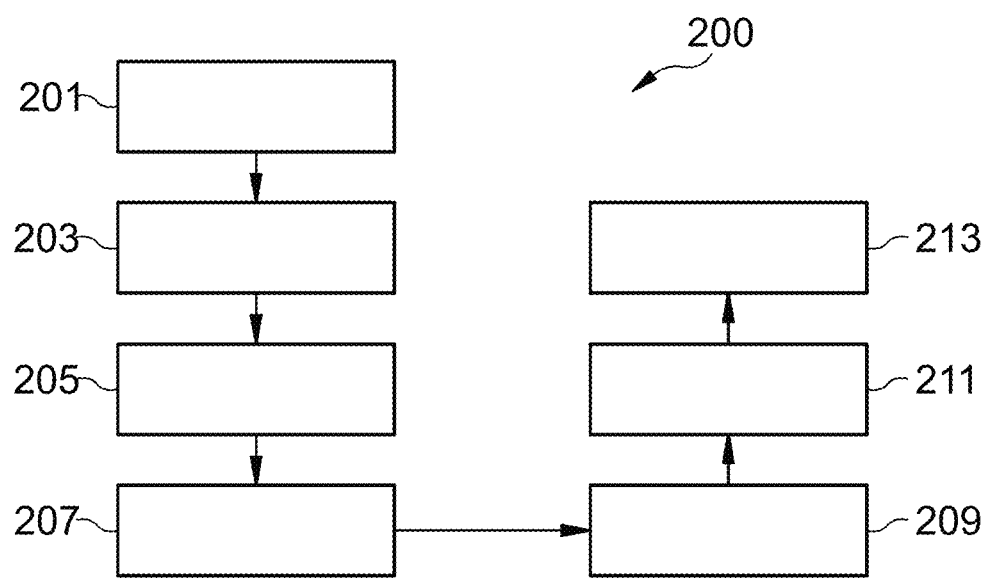

Some of the embodiments will be described in detail, with reference to the following figures, wherein like designations denote like members, wherein:

FIG. 1 shows a system according to an embodiment; and
FIG. 2 shows a method according to an embodiment.

DETAILED DESCRIPTION

In FIG. 1 a system 100 is shown. The system 100 comprises a motion compensation mechanism 101, comprising a first connection interface 103, a second connection interface 105, a tension element 107 and a tension device 109. The system 100 includes system may have a force sensor 120 that measures a force pulling on the tension element 107 and a control device 123 for controlling a tension force applied on the tension element 107 in order to keep the tension element 107 taut. For example, in case a force pulling on the tension element 107 is lower than a given threshold, a first control signal may be provided by the force sensor 120 indicating that a tension force applied on the tension element 107 shall be enhanced. In case a force pulling on the tension element 107 is higher than a given threshold, a second control signal may be provided by the force sensor 120 indication that a tension force applied on the tension element 107 shall be lowered. The first and the second control signals may be indicated by an output device 121 in order to inform a user. Alternatively, or additionally, the first and second control signals may be sent to the tension device 109 for controlling the tension force. The system 100 further comprises a contact sensor 122 for sensing a contact between the first component 111 and the second component 113, and the control device 123 is configured to control the tension device 109 in response to a signal provided by the contact sensor 122 indicating a contact between the first component 111 and the second component 113 such that the tension device 109 applies a force on the tension element 107 that blocks a movement of the first component 111 back and forth on the given trajectory.

The first connection interface 103 is connected to a first component 111 of a wind turbine, such as generator, for example.

The second connection interface 105 is connected to a second component 113 of a wind turbine, such as a nacelle, for example.

In order to connect the first component 111 with the second component 113, a crane 115 is used to lift the first component 111, and to move the first component 111 along a given trajectory towards the second component 113.

To avoid strong loads on the crane 115 and/or between the first component 111 and the second component 113, the motion compensation mechanism 101 is used. The motion compensation mechanism 101 ensures that the tension element 107 is kept under tension to minimize movement of the first component 111 and the second component 113 away from the given trajectory. This means, the tension element 107 allows for a movement of the first component 111 and the second component 113 along the given trajectory but minimizes a movement away from the given trajectory. Accordingly, even if the crane 115 is mounted on a vessel moving at the sea, the first component 111 and the second component 113 can be brought together in a controlled movement.

To ensure that the tension element 107 is kept taut, the tension device 109 is used to provide a tension force that is dynamically adjusted as the first component 111 and/or the second component 113 moves. This means that the tension force is enhanced as a force pulling on the tension element 107 lowers.

In order to avoid an overload of the motion compensation mechanism 101, the tension force may be lowered as a force pulling on the tension element 107 raises above a given threshold, such that a movement of the first component 111 and/or the second component 113 away from the given trajectory is buffered but not blocked.

In FIG. 2 a method 200 is shown. The method 200 comprises a connection step 201 for connecting an embodiment of the system described herein with a first component using the first connection interface and with the second component using the second connection interface, a moving step 203 for moving the first component relative to the second component on a given trajectory by a crane using the motion compensation mechanism, wherein the motion compensation mechanism allows a movement of the first component relative to the second component as the first component and the second component move relative to each other on the given trajectory, and a compensation step 205 for keeping the tension element under constant tension as the first component and the second component move relative to each other.

Optionally, the method 200 may further comprise a blocking step 207 for applying a blocking force on the tension element that blocks a movement of the first component back and forth on the given trajectory as the first component and the second component contact each other, a fixation step 209 for fixating the first component on the second component using a number of fixings, a release step 211 for releasing the blocking force from the first component, and a removing step 213 for removing the system from the first component and the second component.

The blocking step 207 may be carried out as soon as the first component and the second component contact each other in order to secure the first component and the second component at each other.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system for assembling components of a wind turbine comprising:
   a motion compensation mechanism, wherein the motion compensation mechanism comprises:
      a first connection interface for connection with a first component of the wind turbine moved by a crane;
      a second connection interface for connection with a second component of the wind turbine;
      a tension element connecting the first connection interface and the second connection interface; and a tension device including a force sensor for keeping the tension element under constant tension as the first component and the second component move relative to each other, wherein the motion compensation mechanism allows a movement of the first component relative to the second component as the first component and the second component are moved relative to each other on a given trajectory, wherein the tension device is used to provide a tension force on the tension element, wherein the tension force is dynamically adjusted during assembly of the first component and the second component in response to force pulling at the tension device based on measurements from the force sensor to dynamically respond to movement of the first component and the second component such that when a second force pulling on the tension element is below a threshold the tension force provided by the tension device is dynamically adjusted to be increased, and such that when the second force pulling on the tension element is above the threshold the tension force provided by the tension device is dynamically adjusted to be decreased, and wherein the tension device automatically applies a high predetermined force on the tension element that blocks a movement of the first component back and forth on the given trajectory in response to a signal provided by a contact sensor.

2. The system according to claim 1, wherein the motion compensation mechanism is configured to provide a counterforce to a force that causes an increasing distance between the first component and the second component.

3. The system according to claim 1, wherein the motion compensation mechanism is configured to pull the first component and the second component together or to release the first component for a movement of the first component and the second component apart from each other.

4. The system according to claim 1, wherein the motion compensation mechanism comprises an interface for releasing or compensating a movement of the first connection interface relative to the second connection interface.

5. The system according to claim 1, wherein the tension device is configured to apply a torque on the tension element that allows a movement of the first connection interface back and forth on the given trajectory but constantly keeps the tension element under tension.

6. The system according to claim 1, wherein the tension device is configured to apply a force on the tension element that blocks a movement of the first component back and forth on the given trajectory as soon as the first component is in contact with the second component.

7. The system according to claim 1, wherein the system is configured to guide the first component and the second component on the given trajectory.

8. The system according to claim 1, wherein the system includes the contact sensor that senses a contact between the first component and the second component, and wherein the system comprises a control device that is configured to control the tension device in response to a signal from the contact sensor indicating a contact between the first component and the second component such that the tension device automatically applies the high predetermined force on the tension element that blocks the movement of the first component back and forth on the given trajectory in response to the signal provided by the contact sensor.

9. The system according to claim 8, wherein the high predetermined force is maintained such that a lifting rigging above the first component is held tight to the first component.

10. The system according to claim 1, wherein the motion compensation mechanism is configured to ensure that the tension element is kept under tension during assembly of the first component and the second component to minimize movement of the first component and the second component away from the given trajectory.

11. The system according to claim 1, further comprising:
a control device configured to receive control signals from the force sensor during the assembly of the first component and the second component; and
an output device configured to indicate the control signals to inform a user.

12. The system according to claim 11, wherein the control device is configured to send control signals to the tension device for controlling the tension force during the assembly of the first component and the second component.

13. A method for connecting a first component and a second component, the method comprising the following steps:
providing a system having a motion compensation mechanism, wherein the motion compensation mechanism includes a first connection interface for connection with a first component of the wind turbine moved by a crane, a second connection interface for connection with a second component of the wind turbine, a tension element connecting the first connection interface and the second connection interface, and a tension device for keeping the tension element under constant tension as the first component and the second component move relative to each other;
connecting the system with the first component using the first connection interface and with the second component using the second connection interface;
moving the first component relative to the second component on a given trajectory by the crane and the motion compensation mechanism, wherein the motion compensation mechanism allows a movement of the first component relative to the second component as the first component and the second component move relative to each other on the given trajectory;
keeping the tension element under constant tension as the first component and the second component move relative to each other;
connecting the first component and the second component;
providing a tension force, during the connecting, on the tension element using the tension device;
dynamically adjusting the tension force, during the connecting the first component and the second component, in response to force pulling at the tension device based on measurements from a force sensor to dynamically respond to movement of the first component and the second component including dynamically adjusting the tension force provided by the tension device when a second force pulling on the tension element is below a threshold to increase the tension force and/or dynamically adjusting the tension force provided by the tension device when the second force pulling on the tension element is above the threshold to decrease the tension force; and
automatically applying, by the tension device, a high predetermined force on the tension element that blocks a movement of the first component back and forth on the given trajectory in response to a signal provided by a contact sensor.

14. The method according to claim 13, further comprising:
applying a blocking force on the tension element that blocks a movement of the first component back and forth on the given trajectory as the first component and the second component contact each other;
fixating the first component on the second component using a number of fixings;
releasing the blocking force from the first component; and
removing the system from the first component and the second component.

* * * * *